United States Patent
Davis

(10) Patent No.: US 8,118,364 B2
(45) Date of Patent: Feb. 21, 2012

(54) BLANKET FOR PLACEMENT UPON AN INFANT SECURED IN A SEAT AND METHOD OF USE

(76) Inventor: Margaret A. Davis, Bernardsville, NJ (US)

(*) Notice: Subject to any disclaimer, the term of this patent is extended or adjusted under 35 U.S.C. 154(b) by 0 days.

(21) Appl. No.: 12/658,006

(22) Filed: Feb. 1, 2010

(65) Prior Publication Data

US 2010/0170039 A1 Jul. 8, 2010

Related U.S. Application Data

(63) Continuation-in-part of application No. 12/005,406, filed on Dec. 26, 2007, now abandoned.

(51) Int. Cl.
| | |
|---|---|
| A47C 31/00 | (2006.01) |
| B68G 5/00 | (2006.01) |
| A47C 16/00 | (2006.01) |
| A47G 9/02 | (2006.01) |
| A61B 19/00 | (2006.01) |
| A61F 5/37 | (2006.01) |
| A41D 11/00 | (2006.01) |
| A41D 1/00 | (2006.01) |
| A41D 3/02 | (2006.01) |
| A41B 9/00 | (2006.01) |
| A41B 13/08 | (2006.01) |
| A41B 3/00 | (2006.01) |

(52) U.S. Cl. ......... 297/219.12; 5/655; 5/494; 128/869; 128/872; 128/874; 2/75; 2/80; 2/98; 2/111; 2/129

(58) Field of Classification Search .............. 5/494, 655, 5/482; 2/69, 69.5, 75, 80, 83, 88, 94, 95, 2/85, 98, 2.14, 129, 131; 297/219.12; 128/869, 128/872, 873, 874
See application file for complete search history.

(56) References Cited

U.S. PATENT DOCUMENTS 782,819 A  2/1905  Bikle ................................ 2/75
(Continued)

OTHER PUBLICATIONS

Original Blanket with Sleeves, Slanket.com found at www.theslanket.com/.

*Primary Examiner* — Jonathan Liu
(74) *Attorney, Agent, or Firm* — Ernest D. Buff; Ernest D. Buff & Associates, LLC.; Margaret A. LaCroix

(57) ABSTRACT

A travel blanket is placed upon an infant in a car seat. The travel blanket has contoured sleeves and an open back construction, as well as stabilization means for securing the base section of the blanket onto an outer, exterior bottom portion of the seat. With these features, the travel blanket can be readily donned upon an infant that is buckled within a car safety seat without the need to adjust safety straps. The travel blanket includes a base section constructed with a base periphery integrated with the base stabilization means. Lateral sections of the travel blanket further include lateral perimeters appointed for aiding in securing the lateral sections over the infant, without wrapping the torso of the infant. Contoured arm sleeves provide enhanced safety to infants. The sleeves snuggly fit over the infant's wrists and do not have loose flowing material about the arms and wrists, which could present a suffocation risk. Construction of the travel blanket ensures a significant amount of coverage over the entire body of the infant that does not contribute to shifting, zero wrapping of the infant's body/torso, and minimal jostling of the infant when applied.

14 Claims, 5 Drawing Sheets

U.S. PATENT DOCUMENTS

| | | | |
|---|---|---|---|
| D59,555 S | 11/1921 | Ladd | D2/861 |
| 1,840,888 A * | 1/1932 | Dooley | 2/75 |
| 2,374,299 A | 4/1945 | O'Hara | 2/69.5 |
| 2,441,900 A | 5/1948 | Oswald | 2/69.5 |
| 2,496,922 A | 2/1950 | Virtue | 2/69.5 |
| 2,530,464 A | 11/1950 | Harman | 2/69.5 |
| 2,578,323 A | 12/1951 | Sillaway | 2/69.5 |
| D288,022 S | 2/1987 | Marconi | D2/862 |
| 4,662,006 A | 5/1987 | Ross, Jr. | 2/158 |
| D296,378 S | 6/1988 | Coates | D2/719 |
| 4,765,037 A | 8/1988 | Perry | 24/301 |
| 4,901,371 A | 2/1990 | Christians | 2/69.5 |
| 5,129,406 A | 7/1992 | Magnusen et al. | 128/873 |
| 5,131,096 A | 7/1992 | Olson | 2/75 |
| 5,394,565 A | 3/1995 | Stewart et al. | 2/69 |
| 5,418,979 A | 5/1995 | Senderowicz | 2/75 |
| 6,036,260 A * | 3/2000 | Mullen | 297/184.13 |
| 6,081,923 A | 7/2000 | Marks | 2/49.3 |
| 6,240,561 B1 | 6/2001 | McGinnis | 2/69.5 |
| 6,260,199 B1 | 7/2001 | Grunstein et al. | 2/69 |
| 6,317,893 B1 | 11/2001 | Walton | 2/227 |
| 6,394,543 B1 | 5/2002 | Dunne et al. | 297/219.12 |
| 6,401,248 B1 | 6/2002 | Christensen | 2/69 |
| 6,408,439 B1 | 6/2002 | Garforth-Crippen | 2/80 |
| 6,450,168 B1 | 9/2002 | Nguyen | 128/869 |
| 6,948,200 B2 | 9/2005 | Wyman | 5/494 |
| D510,792 S | 10/2005 | Vazquez et al. | D2/719 |
| 2005/0262633 A1 | 12/2005 | Haleem | 5/482 |
| 2006/0174410 A1 | 8/2006 | Mastandrea | 5/482 |

* cited by examiner

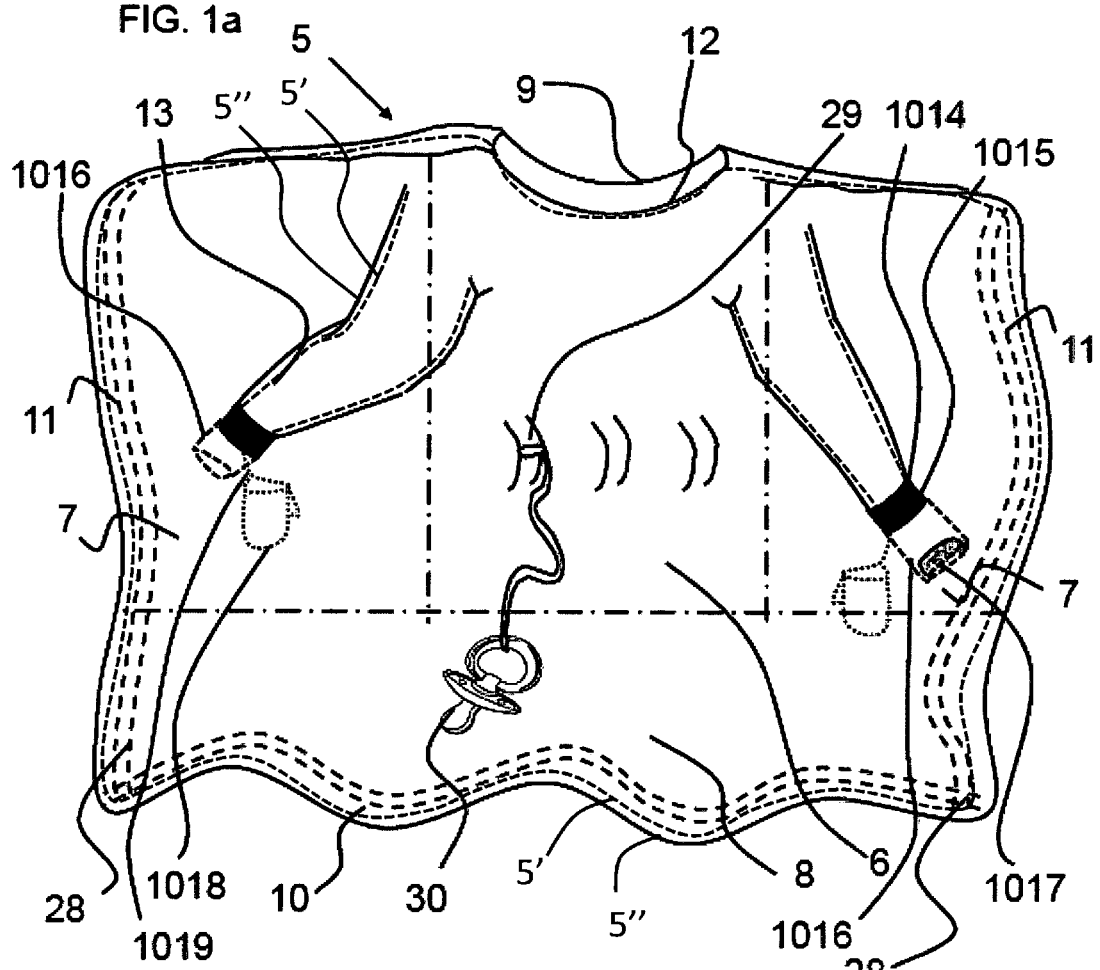
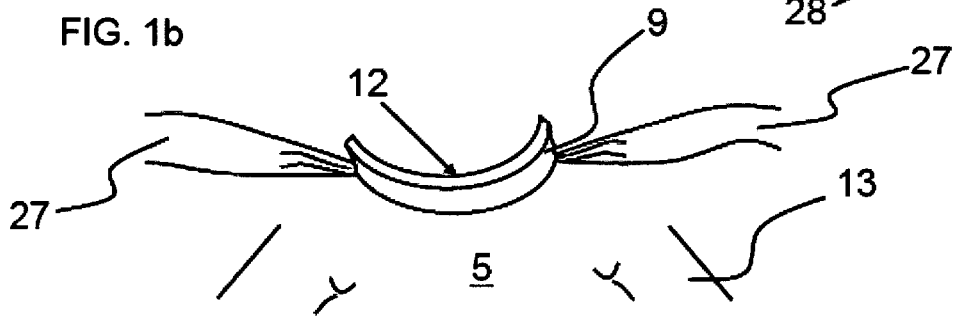

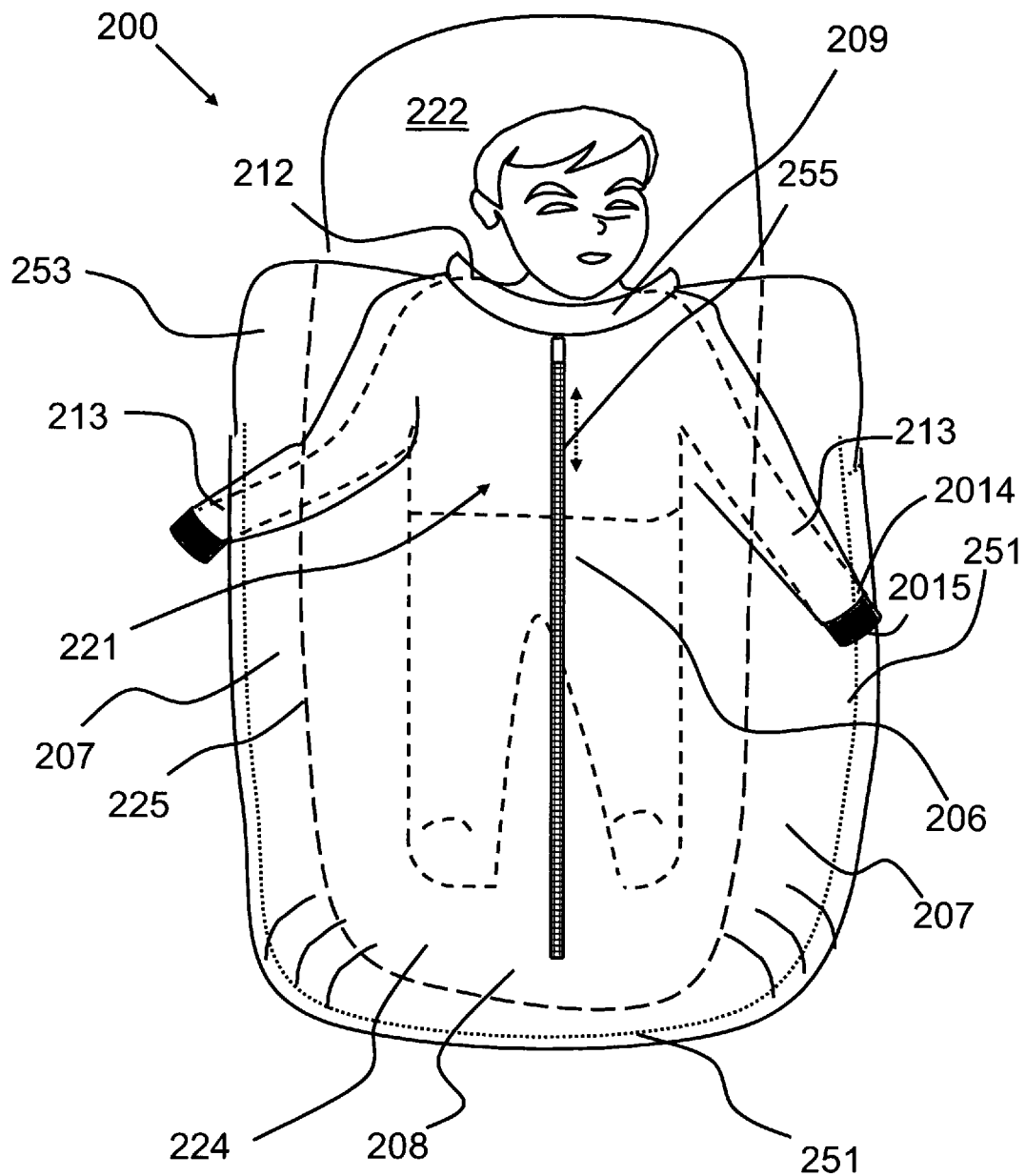

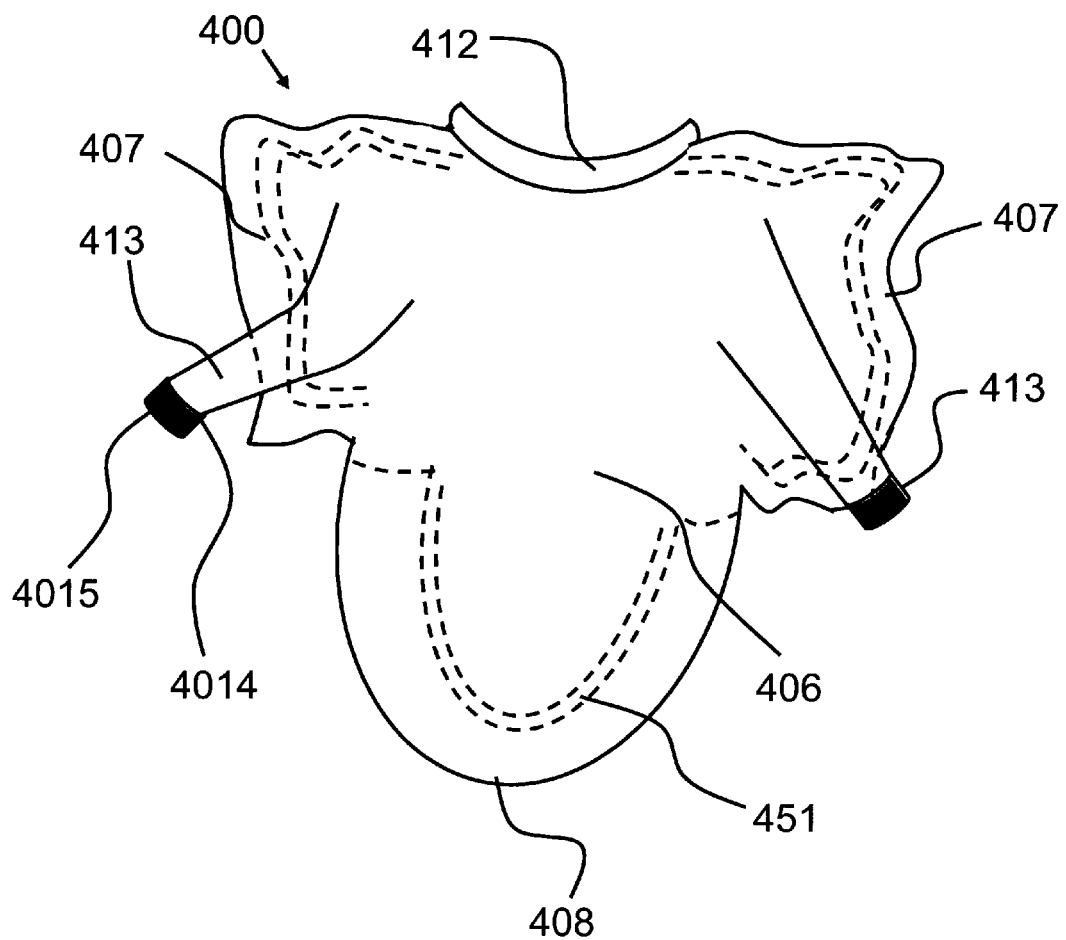

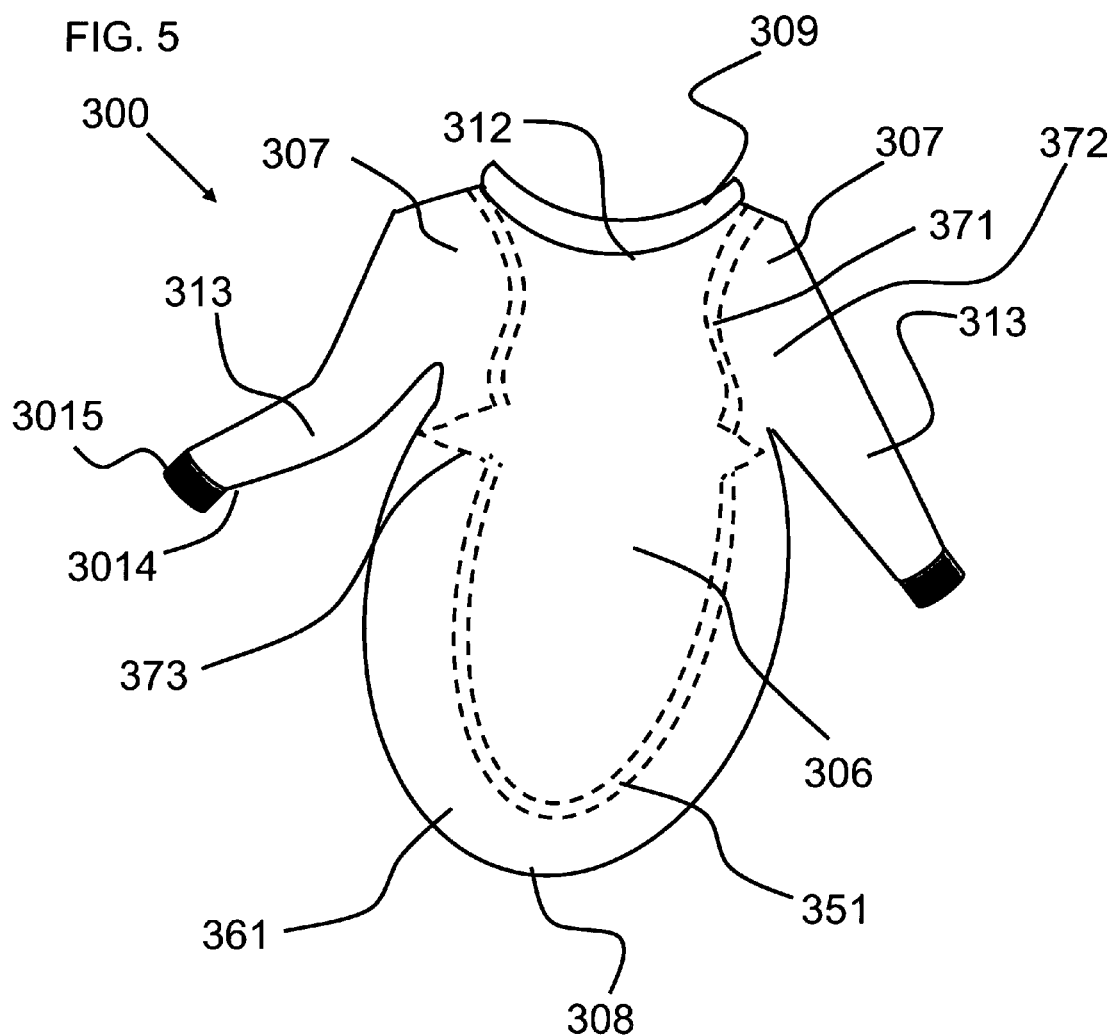

BLANKET FOR PLACEMENT UPON AN INFANT SECURED IN A SEAT AND METHOD OF USE

CROSS-REFERENCE TO RELATED APPLICATIONS

This application is a continuation-in-part of U.S. patent application Ser. No. 12/005,406, filed Dec. 26, 2007 now abandoned, the disclosure of which is hereby specifically incorporated by reference thereto.

BACKGROUND OF THE INVENTION

1. Field of the Invention

The present invention relates to a blanket for placement upon an infant buckled in a seat and method of using same; and more particularly, to a travel blanket having specially contoured sleeves and an open back construction so that the blanket can be placed upon and worn by an infant buckled in a seat while avoiding any need for adjusting the safety straps and disturbing the infant.

2. Description of the Prior Art

Laws involving installation and use of child car seats are quite complex and rigorously enforced. Proper installation and fit compel that only one or two finger widths of leeway separate the car seat straps from the body of a child positioned therewithin. This rather "tight" fit is required to assure the safety of a child riding in a car seat. During winter months or cold, damp conditions, it is difficult to properly place a child within a car seat, owing to the presence of winter clothing such as jump suits, jackets and the like. When positioning the child in a car seat during cold weather, the straps must painstakingly be adjusted to compensate for the additional outer garments worn.

Moreover, infants and toddlers pose unique safety risks as this vulnerable group of individuals can be subject to suffocation and/or injury due to garments having excessive material. In particular, where an infant's arms and hands are covered with draping material, the excess material poses an annoyance to the infant that likely causes crying outbursts and discomfort. Additionally, the draped material poses a safety issue as the infant could readily become entangled in the excess material, subjecting the infant to injury or suffocation. Wide sleeves or excess material in general pose suffocation and injury risks, as infants and toddlers do not have the motor skills to move or free themselves from draping wide sleeves and the like. Such excess material and wide sleeve construction can contribute to SIDS while the caregiver is driving and cannot see that the infant is trapped in the draping material. Serious considerations need to be analyzed and implemented when constructing a wearable blanket device for this particularly vulnerable age group.

Several blanket-sacs, buntings and bag-like articles have been provided for keeping infants warm when sleeping in a crib or cradle, but these blanket-sacs are not and cannot readily function as travel blankets in car seats and strollers. For example: U.S. Pat. No. 782,819 to Bikle discloses a fold over sleeping blanket; U.S. Pat. No. 2,374,299 to O'Hara discloses a sleeping bag for infants; U.S. Pat. No. 2,441,900 to Oswald discloses a child's garment having sleeve-like portions and a body portion; U.S. Pat. No. 2,496,922 to Virtue discloses an infant's sleeping garment (bag like); U.S. Pat. No. 2,530,464 to Haman discloses an infant's sleeping bag; U.S. Pat. No. 2,578,323 to Sillaway discloses an envelope-shaped garment having sleeves and being closed entirely along its bottom and sides; U.S. Pat. No. 4,901,371 to Christians discloses a baby bag garment; U.S. Pat. No. 5,129,406 to Magnusen et al. discloses an infant garment comprised of a saclike body with sleeves; U.S. Pat. No. 5,418,979 to Senderowicz discloses an infant sac including sleeves; and U.S. Design Pat. No. D296,378 to Coates discloses an ornamental design for a sac like structure having a front opening and sleeves. These garments, sac/bag-like articles are not capable of functioning in conjunction with a car seat or stroller and would interfere with proper safety strapping procedures. Generally, in operation of these bag-like articles a child is laid onto the back section of the garment/blanket and is then encased or enclosed therein via an opening in the front. As a result, attempting to utilize these sacs/bag-like articles during travel in a car seat (or stroller) would require the child to be inserted into the blanket, placed into the car seat, and the safety straps of the car seat adjusted for awkward and improper buckling as these bag-like articles do not adequately provide entry points for proper placement of the safety straps. Accordingly, these structures are not structurally capable of operating and functioning as coverings for an infant in a car seat.

Other infant blankets have been provided that generally include constructs as a garment/robe wherein sleeve portions and a panel for wrapping an infant is provided. For example(s): U.S. Pat. No. 5,131,096 to Olson discloses a versatile child's garment including a torso portion, an attachable hood and sleeves; U.S. Pat. No. 6,240,561 to Mc Ginnis discloses disposable infant garments; U.S. Pat. No. 6,450,168 to Nguyen discloses an infant's sleep blanket/garment for use with medical monitoring devices, which is offered as either a sleep sack or a sleep shirt; and U.S. Design Pat. No. D510,792 to Vazquez et al. discloses an ornamental design for an attached infant sleeper and blanket. Again, these articles are arranged to be utilized in a crib or cradle and are not capable of functioning, or adequately constructed, in conjunction with a car seat or stroller as these articles would interfere with safety straps. When donning these articles, a child is laid onto the back section of the garment/blanket and is then wrapped therein via an opening in the front. As a result, attempting to utilize these articles during travel in a car seat (or stroller) would require the child to be inserted into the garment, placed into the car seat, and the safety straps of the car seat adjusted for awkward and improper buckling as these articles do not adequately provide entry pointes for proper placement of the safety straps and are not travel blankets.

Various bib articles have been provided, which include a panel, a collar, and sleeves and are appointed to be placed frontward on an infant sitting in a high-chair for feeding. For example(s): U.S. Pat. No. 6,081,923 to Marks discloses an extended bib having cuffed sleeves and a free bottom edge having fasteners provided for engaging a bottom edge to a food tray; U.S. Design Pat. No. D59,555 to Ladd discloses an ornamental design for a bib having a pair of sleeves and a collar with a neck tie; and U.S. Design Pat. No. D288,022 to Marconi discloses an ornamental design for a bib with long sleeves provided with a pocket in front for collecting food or holding items/food. These sleeved-bib articles do not extend to cover an infant's legs and feet. Therefore, any application of the sleeved-bib articles as a blanket would be thwarted as a bib does not cover an infant's legs and does not provide a large enough surface area on lateral edges to offer blanket coverage to an infant's torso.

Some travel blankets have been provided that are appointed to integrate within a car seat covering. For example: U.S. Pat. No. 6,394,543 to Dunne et al. discloses a seat covering that includes a main body portion forming a pocket that fits over a seating device, and at least one blanket flap portion foldably coupled to the main body portion. Such car seat coverings must be applied to the seat before the infant is placed therein, and cannot be removed from the seat when the infant is lifted out. Further, the infant can readily kick or pull on the blanket flap portion and expose himself/herself to the cold, or cause pooling of the flap near the infant's face thereby posing a suffocation risk to which the parent would not be aware of during driving.

Even where various travel blankets that have been provided can be placed upon an infant in a seat, these travel blankets fail to provide the ability to secure the blanket to the outer sides and bottom edges of a car seat/stroller seat, and as a result, a child can easily kick these travel blankets off from their feet, exposing the child to the cold. What is more, none of the travel blankets provide tapered sleeve cuffs and as a result the blanket can easily fall off of the infant and can pose suffocation and mobility risks as infants motor skills are not fully functioning. Moreover, the disheveled blanket may fold or shift towards the child's face and pose a suffocation hazard. For example: U.S. Pat. No. 6,401,248 to Christensen discloses a travel blanket including a front cover (may include sleeves) with a hood having a front opening and a back opening designed to receive a child's head therethrough when the blanket is received on the child already strapped into a car seat, a stroller and other child carriers; U.S. Pat. No. 6,408,439 to Garforth-Crippen discloses a garment that can be donned while the wearer is seated, such as in a child car seat. The garment has an upper portion that wraps around the wearer's torso from the front to cover the sides and back of the child's torso. It also has a pair of sleeves, a neck opening having fasteners to secure behind the wearer's neck, and a lower portion that extends downward and is configured as a pouch for enclosing both of the wearer's legs from approximately the hips to the feet. The sleeve cuffs are not tapered and do not snuggly secure the infant's wrist; U.S. Pat. No. 6,948,200 to Wyman discloses a blanket appointed to be wrapped around a user in a sitting or semi-prone position. The blanket includes a lower portion and a top portion. The lower portion has a pouch to cover the feet and legs of the user, and the top portion wraps around the user; and the Slanket® Blanket, The Original Blanket with Sleeves, Slanket.com® found at http://www.theslanket.com/index.php?path=the_product discloses a blanket having a panel and sleeves with a billowing loose neck that is appointed to be worn by persons when relaxing at home/sitting down. Each of these blankets involves flowing, billowing material that would render safety risks if utilized by infants.

Although these aforementioned blankets are provided with sleeves and portions that could conceivably cover the infant in the car seat, they require substantial manipulation and movement of the infant when they are being applied. As a result the infant may awaken and/or become agitated and annoyed. Moreover, wherein the infant is a newborn or very young, such movement may require less than delicate maneuverings. What is more, none of the travel blankets provide tapered sleeve cuffs. Consequently, the blanket can easily fall off of the infant and can pose suffocation and mobility risks, as an infant's motor skills are not fully functioning. The disheveled blanket may fold or shift towards the child's face and pose a suffocation hazard.

Application of the variously disclosed travel blankets, include disadvantageous structures, for example: (i) those having hoods require that after the infant's arms are received in the sleeves, the infant's head must be elevated and angled acutely forward from the seat to be inserted in the hood; (ii) those having portions that must wrap around to the back of the wearer's/infant's torso from the front operate to cause the parent/care giver to substantially lean the child's body forward while still strapped in the seat, tending to result in a need to adjust the safety straps to provide ample room to extend the side extension/wraps behind the child's back—otherwise, the child would be in discomfort while the parent's hands are jammed behind the child's spine; (iii) those having pouches or other leg and feet containment sections for receiving and housing the infant's legs and feet require the parent to literally lift the infant's legs and feet, bend or otherwise contort the infant's legs to force (which, if the infant is kicking can be quite traumatic) them into the pouch; and (iii) loose sleeve collars and necklines posing suffocation risks. All the devices result in a cumbersome donning task, ultimately waking any sleeping baby and annoying any contented baby. While encasement of the infant's legs, preventing the blanket from shifting therefrom, results not only in mass manipulation of the infant's legs and feet, but an infant likely feeling overly constrained and agitated as the legs and feet become bound within the pouch or pocket. None of the blankets uniquely address the needs particularly associated with infants and toddlers. These needs include a blanket design that can be readily placed on the infant with minimal disruption, while providing a sleek structure that does not pose suffocation risks.

None of the blankets, garments or travel blankets heretofore disclosed provide a travel blanket that is frontward donned on an infant strapped in a car seat (or stroller, etc.) by inserting an infant's arms into contoured, or tapered, sleeves, covering the infant's entire torso and legs without moving same and simply securing the blanket's perimeters to the exterior sides and bottom portions of the seat. Such a construct would provide a travel blanket that requires minimal manipulation and movement of the infant, while ensuring that the travel blanket does not shift and expose the infant to the cold or pose a suffocation risk.

There remains a need in the art for a travel blanket having sleeve members and an open back construction so that the blanket can be readily donned upon an infant buckled within a seat without the need to adjust safety straps. Also needed is a travel blanket having a base section constructed with a base periphery integrated with base stabilization means therein for securing the base section of the blanket onto an outer, exterior bottom portion of the seat so that the blanket is secured over the infant without the need to move the infant's body or legs, thus eliminating struggling with the infant and unwanted shifting of the blanket. Moreover, there is a need in the art for a travel blanket having lateral sections including a lateral perimeter appointed for aiding in securing the lateral sections of the blanket over the infant. Additionally, there is a need in the art for a travel blanket having contoured, or tapered, sleeves to mitigate movement of the blanket, secure the blanket on the infant, and mitigate suffocation risks. In summary, there is a need in the art for a travel blanket that ensures a significant amount of coverage over the entire body of the infant, secure coverage that does not lend to shifting of the blanket, and minimal jostling or moving of the infant when the blanket is being applied onto the infant.

SUMMARY OF THE INVENTION

The present invention provides a travel blanket that is frontward donned on an infant strapped in a car seat (or stroller, etc.) by inserting an infant's arms into contoured, or tapered, sleeves, covering the infant's entire torso and legs without moving same and simply securing the blanket's perimeter to the exterior sides and bottom portions of the seat. Accordingly, the travel blanket's construction functions require minimal manipulation and movement of the infant when the blanket is being applied, while ensuring that the travel blanket does not shift and expose the infant to the cold or pose a suffocation risk.

The travel blanket comprises contoured, or tapered, sleeve members and an open back construction so that it can be readily donned upon an infant buckled within a seat without the need to adjust safety straps. What is more, the travel blanket includes a base section constructed with a base periphery which may be integrated with base stabilization means therein for securing the base section of the blanket onto an outer, exterior bottom portion of the seat so that the blanket is secured over the infant without the need to move the infant's body or legs, thus eliminating struggling with the infant and unwanted shifting of the blanket. Lateral sections of the travel blanket may further include lateral perimeters appointed for aiding in securing the lateral sections over the infant, without wrapping the torso of the infant.

Construction of the travel blanket ensures a significant amount of coverage over the entire body of the infant, secure coverage that does not lend to shifting of the blanket, zero wrapping of the infant's body/torso, and minimal jostling or moving of the infant when the blanket is being applied onto the infant.

Inasmuch as infants and toddlers pose unique safety risks involving suffocation and/or injury due to garments having excessive material, an object of this invention is to provide a travel blanket having contoured, or tapered, sleeves to mitigate excess material and entanglement while worn on the infant. Where infants arms and hands are covered with draping material, the excess material poses an annoyance to the infant that is likely to cause crying outbursts and discomfort, and more importantly can cause safety issues. As bulky material in the form of collars and sleeves pose material that an infant can readily become entangled in, excess material and bulkiness when constructing the travel blanket herein should be avoided in order to mitigate risk of injury or suffocation. Such excess material and wide sleeve construction can contribute to SIDS while the caregiver is driving and cannot see that the infant is trapped in the draping material. In order to provide a blanket safe for infants and toddlers, the travel blanket herein has been constructed with sleek contoured, or tapered, sleeve portions and a non-bulky neck or collar.

In one embodiment, the travel blanket for placement upon an infant secured in a seat comprises a central section, lateral sections, a base section, and a collar member arranged to form an open back construction so that the blanket is appointed to be placed upon the infant secured/buckled within the seat by way of safety straps/seat belts. Additionally, left and right sleeve members are contoured, tapered, fitted and constructed within the central section of the blanket adjacent to each of the lateral sections for receiving the infant's arms. The base section of the travel blanket further comprises a base periphery having a base stabilization means integrated therein. Base stabilization means function to secure the base section of the blanket over the infant and seat to secure onto an outer, exterior bottom portion of the seat. The lateral sections of the travel blanket each comprise a lateral perimeter appointed for aiding in securing the lateral sections of the travel blanket over the infant.

In operation, the left and right sleeve members snuggly and securely receive the arms of the infant and the collar member and the central section rest against the infant's neck, chest, front torso, legs and feet. As the contoured sleeve members snuggly receive the infant's wrists, the blanket does not need further securement; although, securement means may be integrated within the blanket as discussed herein. The lateral sections and base section extend over the infant and the seat and, in a first aspect of the invention, become disposed over the exterior and sides of the seat. In a second, optional, aspect of the invention, the lateral sections and base section are adapted to be secured onto the exterior or outside of the seat. The latter construction facilitates avoiding any need for adjusting the safety straps and jostling, struggling with or otherwise disturbing the infant, while providing a warm, safe environment for the infant during travel.

A method of keeping an infant warm when traveling secured in a seat is provided. The method includes the steps of: (i) placing an infant in a seat, such as a car seat or stroller, and securing the child within the seat by way of safety straps; (ii) covering the infant with a travel blanket, the travel blanket comprising: a central section, lateral sections, a base section, and a collar member arranged to form an open back construction so that the blanket is appointed to be placed upon the infant secured within the seat by way of safety straps; left and right contoured/fitted sleeve members constructed within the central section of the blanket adjacent to each of the lateral sections; (iii) inserting each arm of the infant within each of the sleeve members, respectively, and pressing the collar member against the infant's neck and the central section against the infant's chest so that the lateral sections and the base section extend proximate to outer side portions and an outer bottom portion of the seat, respectively; and (iv) optionally, securing the lateral sections and the base section to the outer side portions and the outer bottom portion of the seat, respectively, while avoiding any need for adjusting the safety straps and jostling or otherwise disturbing the infant.

BRIEF DESCRIPTION OF DRAWINGS

The invention will be more fully understood and further advantages will become apparent when reference is had to the following detailed description and the accompanying drawings, in which:

FIG. 1a is a schematic top-front view of an embodiment of the travel blanket for placement upon an infant secured in a seat;

FIG. 1b shows a sectional top view of an optional neck segment of the collar member along with optional elongated shoulder flaps provided adjacent to and between the lateral sections and collar member for enhanced covering of the infant's shoulders;

FIG. 3 is a top view of the travel blanket donned on an infant strapped in a car seat with the lateral sections and base section secured on the exterior, outer portions of the seat;

FIG. 4 illustrates an embodiment of the travel blanket for placement upon an infant secured in a seat, wherein the base stabilization means includes an elastic material so that it can be merely stretched to extend over and clasped onto the exterior, outer bottom portion of the car seat without the need to move the infant; and FIG. 5 illustrates an alternative embodiment of the travel blanket for placement upon an infant secured in a seat, wherein both the base stabilization means and lateral stabilization means include an elastic material so that they can be merely stretched to extend over and clasped onto the shoulders, feet and legs of the infant without the need to move the infant.

DESCRIPTION OF THE PREFERRED EMBODIMENTS

Figure 2:
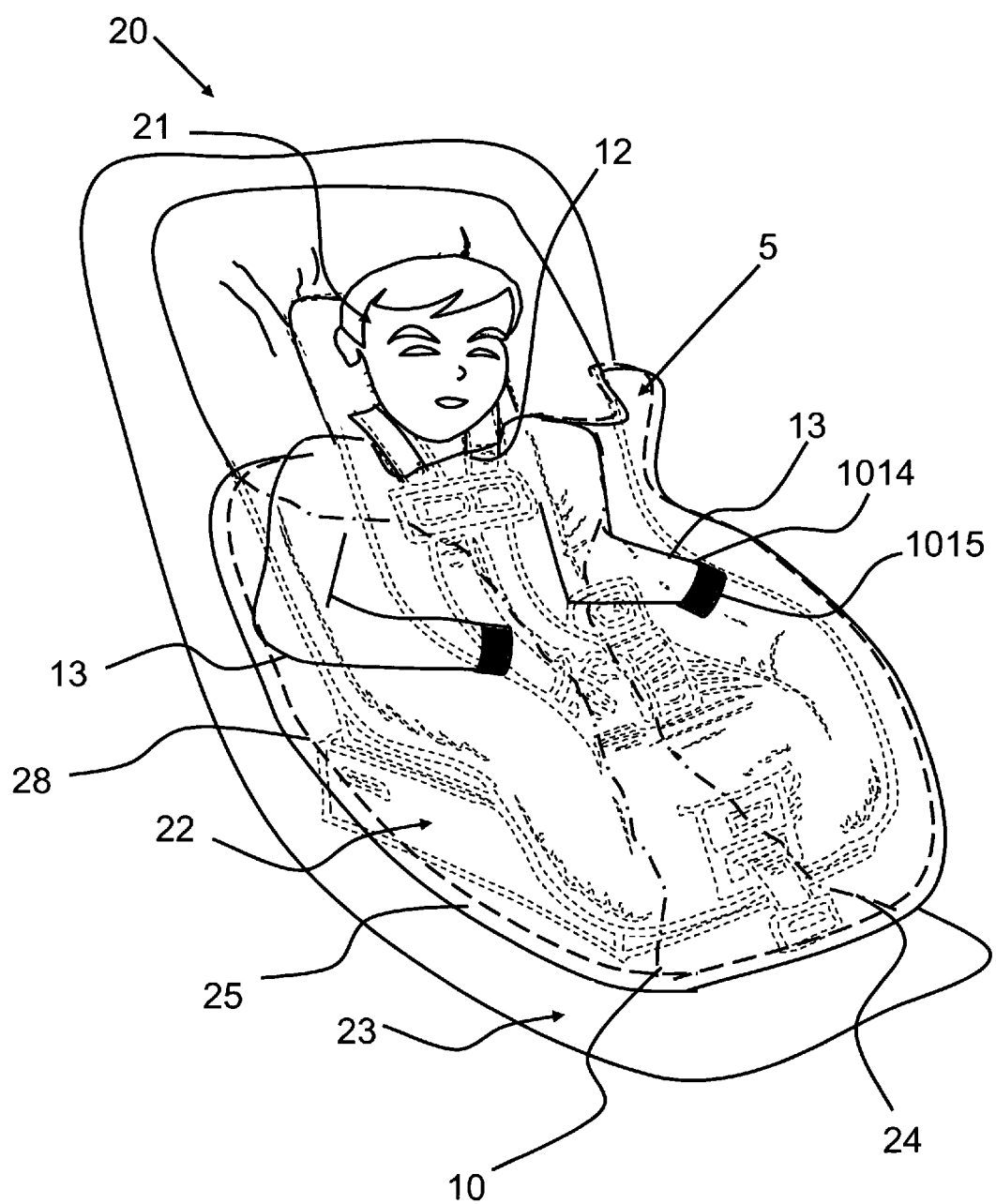
FIG. 2 is a side view of the travel blanket donned on an infant strapped in a car seat with the lateral sections and base section secured on the exterior, outer portions of the seat.

This invention relates to a travel blanket that is frontward donned on an infant strapped in a car seat (or stroller, etc.) by inserting an infant's arms into contoured sleeves, covering the infant's entire torso and legs without moving the same and simply securing the blankets perimeters to the exterior sides and bottom portions of the seat. When using the travel blanket, an infant/child can be placed in a car seat and kept warm while riding therein during winter months without having to further adjust the car seat straps. It is advantageous to have a travel blanket design in which the sleeves fit closely about the wrist of the wearer/or are contoured, or tapered, to the wrists of the wearer as it promotes warmth and aids in retaining body heat. Contoured/fitted sleeves of the travel blanket also help to secure the blanket, as the closely fitting sleeves cause the blanket to remain in place without need of fasteners of any kind. Wide sleeves (such as those present in the constructs of prior art workers) are disadvantageous for an infant, since the infant has limited control over the sleeve positioning. The wide sleeves could become caught or snagged on the car seat and would interfere with the infant's ability to use his/her hands as well as pose suffocation risks.

The travel blanket provides a blanket that is frontward donned on an infant strapped in a car seat (or stroller, etc.) by inserting an infant's arms into sleeves, covering the infant's entire torso and legs without moving same and simply securing the blankets perimeters to the exterior sides and bottom portions of the seat. Accordingly, the travel blanket's construction functions require minimal manipulation and movement of the infant when the blanket is being applied. Snaps or hook and loop fastening systems of the type known as VEL-CRO® are not needed to secure the blanket about the infant. The simplicity and convenience of securing the blanket about an infant in a car seat without such attachment mechanisms is advantageous for young mothers. The contoured arm construction keeps the blanket in place about the infant without need of snaps or hook and loop fastening mechanisms such as that sold under the trade name VELCRO, which are uncomfortable, difficult to fasten when an infant is in a car seat, and can tend to wake a baby during residence therein. As a result, the travel blanket's construction ensures that the blanket does not shift and expose the infant to the cold or pose a suffocation risk.

The travel blanket comprises contoured/tapered sleeve members and an open back construction so that it can be readily donned upon an infant buckled within a seat without the need to adjust safety straps. The collar member comprises an abutting neck segment providing extra thickness for comfort and added warmth to the infant. This abutting neck segment is in a rolled condition. In addition, the travel blanket includes a base section constructed with a base periphery integrated with base stabilization means therein for securing the base section of the blanket onto an outer, exterior bottom portion of the seat so that the blanket is secured over the infant without the need to move the infant's body or legs, thus eliminating struggling with the infant and unwanted shifting of the blanket. Lateral sections of the travel blanket further include lateral perimeters appointed for aiding in securing the lateral sections over the infant, without wrapping the torso of the infant. Additionally, the contoured sleeve openings are sized to conform with, or hug, the wearer's wrists. This contoured sleeve construction helps ensure the presence of a significant amount of coverage over the entire body of the infant. A secure coverage is thereby provided that virtually eliminates shifting of the blanket or zero wrapping of the infant's body/torso, and minimizes jostling or moving of the infant during donning of the blanket to an infant in a car seat.

The travel blanket for placement upon an infant secured in a car seat comprises a central section, lateral sections, a base section, and a collar member arranged to form an open back construction so that the blanket is appointed to be placed upon the infant secured/buckled within the seat by way of safety straps/seat belts. In operation, the left and right sleeve members receive the arms of the infant and the collar member and the central section rest against the infant's neck, chest, front torso, legs and feet. The lateral sections and base section extend over the infant and the seat and become disposed over the exterior and sides of the seat, or they can be adapted to be secured onto the exterior or outside of the seat. The latter construction facilitates avoiding any need for adjusting the safety straps and jostling, struggling with or otherwise disturbing the infant, while providing a warm, safe environment for the infant during travel.

The infant, wearing clothing of the type worn indoors during summer or winter, is placed in the car seat and the straps are fastened about the infant. Thereafter, when traveling during late fall or winter, the travel blanket is placed about the infant. In a second embodiment, the travel blanket is tucked around the back of the car seat. Optionally, in a third embodiment, the travel blanket is secured to the exterior outer side and bottom portions of the car seat. The travel blanket has two sleeve-like members into which the arms of the infant can be placed. Once the infant's arms are securely positioned within the sleeves of the travel blanket, the remaining portion is placed atop the trunk and legs of the infant; or tucked behind the car seat. In the third embodiment, the remaining portion of the travel blanket is secured on the exterior of the car seat. The infant is thereby kept warm while riding in the car without need to adjust the car seat straps to accommodate the additional thickness of a jump suit, jacket, or the like. When traveling to a mall or other like venue, the infant can be lifted from the car seat with the travel blanket still in tact around the infant, and placed in a stroller, with the lateral sections and base sections secured to the exterior or outer portions of the seat of the stroller. The travel blanket will keep the infant warm while riding in the stroller to an indoor venue, such as a mall, grocery store, or the like. Once inside the indoor venue, the travel blanket can be readily removed from the infant to prevent the infant from becoming too warm. This advantageously eliminates the need for putting a jump suit on and off of an infant and for adjusting the car seat straps to accommodate the type of outer wear used on specific occasions. The optional muffle and/or mittens also provide the ability to cover the infant's fingers so that the infant cannot scratch him/herself, as is a common problem with very young/newborn infants.

The travel blanket can be made of fleece, cotton, or other warm fibrous materials, and may include a single layer or double insulated and/or reversible layers. Heavy fleece or light fleece blankets can be constructed for fall or winter travel. An outer water proof and/or wind proof shell (having the same corresponding structure as the travel blanket and appointed to intimately fit there over) is preferably provided to cover the travel blanket and prevent water (or winds) from penetrating onto and through fleece, cotton, etc., to keep the infant dry and warm during inclement weather. Preferably, this water proof shell (and/or wind proof shell) is composed of a polymeric, vinyl, or a Teflon® coated material, or the like. Moreover, preferably the water proof shell is removable, such as connected by way of a zipper with traverses the edges of the blanket (i.e. the lateral perimeters and base periphery) and traversing to abut the collar member. This water proof shell may be removable by way of hook and loop fastener portions (such as those sold under the trade name VEL-CRO®) mating on the corresponding edges of the water proof shell and the shell to the edges of the blanket (i.e. the lateral perimeters and base periphery) and traversing to abut the collar member. The travel blanket can come in different sizes, such as small (to fit newborn to one year old infants), medium (to fit one year to three year old toddlers) or large (to fit three year to five year old children). Larger, children and/or adult sized blankets can also be provided for keeping an older child/adult warm while at home or during travel (especially elderly), and having particular significance in keeping an adult who is in a wheelchair warm.

FIG. 1a shows a schematic top-front view of an embodiment of the travel blanket for placement upon an infant secured in a seat, shown generally at 5. FIG. 1b shows a sectional top view of an optional neck segment of the collar member along with optional elongated shoulder flaps provided adjacent to and between the lateral sections and collar member for enhanced covering of the infant's shoulders. FIG. 2 illustrates a side view of the travel blanket donned on an infant strapped in a car seat with the lateral sections and base section secured on the exterior, outer portions of the seat, shown generally at 20.

In referring to FIGS. 1a, 1b and 2, travel blanket 5 comprises a central section 6, lateral sections 7, and a base section 8. A collar member 12 is constructed within central section 6. Central section 6, lateral sections 7, base section 8, and collar member 12 are arranged to form an open back construction so that blanket 5 is appointed to be placed upon an infant 21 secured within a seat 22 by way of safety straps. A left and right sleeve member 13 is provided, each constructed within central section 6 and being adjacent to each of lateral sections 7, left and right, respectively. An infant's arms are received within sleeve members 13 while collar member 12 rests against the infant's neck when infant 21 is placed in an infant car seat 22/stroller on a vehicle seat 23.

Left and right sleeve members 13 are constructed as contoured, tapered sleeve openings 1014 sized to conform with the wearer's wrists. Contoured sleeve openings 1014 are preferably constructed having bands 1015 which snuggly hug the infant's wrists. Bands 1015 may be constructed as a dense cotton or fleece, or may include elastic material or ribbing. The contoured sleeve openings 1014 are formed so that the infant can wear heavy clothing under the blanket, yet the sleeves hug the infant's wrists. The contoured sleeve openings 1014 may include a muffle 1016 (shown in the phantom) for keeping hands and fingers of the infant warm. In operation, the muffle 1016 is a thick (alternatively fluffy or animal designed and shaped) muffle that slides over the hands. A teether 1017 may be integrated within the muffle 1016 for chewing. The teether 1017 if preferably constructed having a soft shell with water sealed therein, although the teether 1017 may be formed as a silicone (medical grade) or other substance. Muffles 1016 are basically thickly insulated cloth tubes for retaining the infant's hands. Muffles 1016 may be removabley attached to sleeve members 13. Alternatively, sleeve members 13 include mittens 1018. Mittens 1018 are shown in the phantom as optional gear. Mittens 1018 may be fixedly attached to sleeves 13 by way of a band 1019. Band 1019 is a short band, ranging from 1 inch up to 2 inches in length, and is preferably elastic. The short length of the band 1019 is important as longer length bands can pose strangulation risks to infants and toddlers. What is more, the elastic feature allows the bands 1019 to be short, yet stretched when needed to extend over the infant's fingers when the mittens 1018 are being placed on/or taken off from the hand. Alternatively, the mittens 1018 are detachable from said contoured sleeve members 13 and include fastening means. These fastening means may include hook and loop mating fasteners, such as that sold under the tradename Velcro.®

Base section 8 comprises a base periphery having a base stabilization means 10 arranged to engage with an outer bottom portion 24 of car seat 22 so that base section 8 is appointed to extend and tuck around outer bottom portion 24 of seat 22. Base section 8 covers the legs and lower torso of infant 21 and drapes over seat 22 to extend over and be tucked under/engage or secured with outer bottom portion 24 of seat 22 via base stabilization means 10. Lateral sections 7 each comprise a lateral perimeter 11 and are arranged to engage with respective outer side portions 25 of car seat 22 so that lateral sections 7 are each appointed to extend and tuck around each of outer side portions 25 of seat 22. Lateral perimeter 11 of each of lateral sections 7 may further comprise a securing means/lateral stabilization means 28 further arranged to engage with outer side portions 25 of car seat 22 to aid in retaining lateral sections 7 so that infant 21 does not kick or jostle blanket 5 from its position over infant 21 and seat 22. In operation, left and right sleeve members 13 receive the arms of infant 21 and collar member 12 and central section 6 rests against infant's 21 neck, chest, front torso, legs and feet. Lateral sections 7 and base section 8 extend over infant 21 and seat 22 and, in a preferred embodiment of the invention, are appointed to be secured onto the exterior or outside of seat 22. Such construction minimizes any need for adjusting the safety straps and jostling, struggling with or otherwise disturbing infant 21, while providing a warm, safe environment during travel.

Base stabilization means 10 located on the base periphery of base section 8 may comprise a dense weighted cord (or cushioned rim) integrated in the base periphery so that when base section 8 extends over and weights on an exterior, outer bottom portion 24 of car seat 22 so that the legs and feet of infant 21 are not lifted or moved when blanket 5 is secured around outer bottom portion 24 of car seat 22. Alternatively, base stabilization means 10 comprises an elastic material integrated within the base periphery so that base section 8 is merely stretched to extend over and clasped on outer bottom portion 24 of car seat 22. Lateral perimeter 11 of each of lateral section 7 includes a lateral stabilization means 28 further arranged to engage with outer side portions 25 of car seat 22 to aid in retaining lateral sections 7 so that infant 21 does not kick or jostle blanket 5 from position. Alternatively, lateral stabilization means 28 located on lateral perimeter 11 comprises a dense weighted cord so that lateral sections 7 extend over and weight on outer side portions 25 of car seat 22 so that infant's 21 torso, legs and feet are not moved when blanket 5 is secured around outer side portions 25 of car seat 22. Alternatively, lateral stabilization means 28 comprises an elastic lateral band so that lateral sections 7 are merely stretched to extend over and clasped on outer side portions 25 of car seat 22.

Collar member 12 has an optional abutting neck segment 9 for providing warmth and comfort, preferably via extra thickness, to the neck area and collar bones of an infant 21. Preferably, abutting neck segment 9 is a bulk of material configured in a rolled condition. More preferably, abutting neck segment 9 includes a cushion or thicker fleece/fabric swatch integrated therein. Thus abutting neck segment 9 enhances stabilization of the head and neck of infant 21 during travel while providing warmth properties. Abutting neck segment 9 extends only slightly upward from collar member 12 so as to avoid interfering with breathing of infant 21. Elongated shoulder flaps 27 may be provided adjacent to and between lateral sections 7 and collar member 12 for enhanced covering of the infant's shoulders. Elongated shoulder flaps 27 extend substantially parallel with the collar bone and shoulders of child 21, thereby covering to top of the shoulder of child 21.

Herein, blanket 5 (particularly central section 6) is provided with optionally loops or attachment means 29 appointed to removably attach and/secure items to blanket 5, such as pacifiers 30 and toys, so that infant 21 can easily reach and access the item while preventing the item from becoming lost or dropped in the car or outside.

Application of the blanket 5 is initialized with placing the arms of child 21 into each of the respective left and right sleeve members 13 and pushing central section 6 onto the front torso of the child so that neck segment 9 of collar member 12 rests against infant's 21 neck. Lateral sections 7 and base section 8 are extended and allowed to lay adjacent to or tucked around each of outer side portions 25 and outer bottom portion 24 of seat 22, respectively, thereby avoiding any need for adjusting safety straps 26 and jostling or otherwise disturbing infant 21. Optionally the blanket 5 is constructed having a removable thermal lining 5' to adjust for colder days, and optionally the blanket 5 is constructed having an outer water proof shell 5", which may be removable, covering the blanket 5 for preventing water penetration onto the infant.

FIG. 3 is a top of the travel blanket donned on an infant strapped in a car seat with the lateral sections and base section secured on the exterior, outer portions of the seat, particularly by way of an elastic material located on the lateral perimeter and base periphery, shown generally at 200. In reference to FIG. 3, travel blanket 200 comprises a central section 206, lateral sections 207, and a base section 208. A collar member 212 is constructed within central section 206. Collar member 212 has an optional abutting neck segment 209 for providing warmth and comfort to the neck area and collar bones of an infant 221. Left and right sleeve members 213 are provided, each constructed within central section 206 and being adjacent to each of lateral sections 207, left and right, respectively. Left and right sleeve members 213 are constructed as contoured sleeve openings 2014 sized to conform with the wearer's wrists. Contoured sleeve openings 2014 are preferably constructed having bands 2015 which snuggly hug the infant's wrists. Bands 2015 may be constructed as a dense cotton or fleece, or may include elastic material or ribbing. The contoured sleeve openings 2014 may include a muffle 2016 (see FIG. 1) for keeping hands and fingers of the infant warm. Alternatively, sleeve members 2013 include mittens (not shown, see FIG. 1). An infant's arms are received within sleeve members 213 while collar member 212 rests against the infant's neck when infant 221 is placed in an infant car seat 222/stroller on a vehicle seat. Base section 208 comprises a base periphery/base perimeter having a base stabilization means arranged to engage with an outer bottom portion 224 of car seat 222 so that base section 208 is appointed to extend and tuck around outer bottom portion 224 of seat 222. In this embodiment, base section 208 and lateral sections 207 are arranged having a lateral perimeter 211 with lateral stabilization means 251 comprised of an elastic rim/band integrated therein. That is, lateral perimeter 211 of lateral sections 207 each comprise lateral stabilization means 251 comprised of an elastic rim/band that extends into base periphery of base section 208 to perform as lateral and base stabilization means, respectively.

Application of blanket 200 is initialized with placing the arms of child 221 into each of the respective left and right sleeve members 213 and pushing central section 206 of blanket 200 onto the front torso of the child 221 so that neck segment 209 of collar member 212 rests against infant's 221 neck. Lateral sections 207 and base section 208 are extended and elastic rim 251 hugs and secures around each of outer side portions 225 and outer bottom portion 224 of seat 222, respectively, thereby avoiding any need for adjusting safety straps and jostling or otherwise disturbing infant 221 and providing a warm encasing for child 221 without the risk of child 221 kicking or jostling blanket 200. Shoulder members 253 are provided that do not include any elastic material, but are utilized to stretch over a small sector of outer side portions 225. Blanket 200 may include a closable elongated opening 255 located in central section 206 for accessing infant 221 without removing blanket 200 from infant 221. Preferably, closable elongated opening 255 extends from collar member 212 (and abutting neck segment 209), extends down into central section 206 and into a portion of base section 208 so that blanket 200 can be substantially opened for access to infant 221 for various reasons, such as for changing the infant's diaper.

FIG. 4 illustrates an embodiment of the travel blanket for placement upon an infant secured in a seat, wherein the base stabilization means includes an elastic material so that it can be merely stretched to extend over and clasped onto the exterior, outer bottom portion of the car seat without the need to move the infant, shown generally at 400. Travel blanket 400 comprises central section 406, lateral sections 407, base section 408, collar member 412, and left and right sleeve member 413. Left and right sleeve members 413 are constructed as contoured sleeve, or tapered, openings 4014 sized to conform with the wearer's wrists. Contoured sleeve openings 4014 are preferably constructed having bands 4015 which snuggly hug the infant's wrists. Bands 4015 may be constructed as a dense cotton or fleece, or may include elastic material or ribbing. The contoured sleeve openings 4014 may include a muffle 4016 (see FIG. 1) for keeping hands and fingers of the infant warm. Alternatively, sleeve members 4013 include mittens (not shown, see FIG. 1). An infant's arms are received within sleeve members 413 while collar member 412 rests against the infant's neck when placed in an infant car seat/stroller on a vehicle seat. Base section 408 comprises a base periphery/base perimeter having a base stabilization means 451 comprised of an elastic rim/band integrated therein. Lateral perimeter 411 are provided for aiding in securing lateral sections 407, and may comprise a weighted cord, a malleably weighted cord with a flexible wire incorporated therein, or an elastic material.

FIG. 5 illustrates an alternative embodiment of the travel blanket for placement upon an infant secured in a seat, wherein both the base stabilization means and lateral stabilization means include an elastic material so that they can be merely stretched to extend over and clasped onto the shoulders, feet and legs of the infant without the need to move the infant, shown generally at 300. Herein, travel blanket 300 is constructed with both the base section and lateral sections having the elastic rim or band integrated therein as the base and lateral stabilization means, respectively, in a manner that allows blanket 300 to snug against the body of the infant, rather than around the outside of the car seat. Despite the contact with the stabilization means (lateral and base) against the body of the infant rather than the exterior of the car seat, the construction still provides that minimum manipulation of the infant is needed. In keeping with minimizing manipulation and movement of the infant during placement of the blanket the lateral sections and base section only have a minor shelf that extends very shallowly over the shoulders, hugs the torso sides, sides of the legs, and feet only, and does not encase the feet and legs and does not travel substantially behind the shoulder and torso.

Continuing with FIG. 5, in this embodiment blanket 300 comprises a central section 306, lateral sections 307, and a base section 308. A collar member 312 is constructed within central section 306. Collar member 312 has an optional abutting neck segment 309 for providing warmth and comfort to the neck area and collar bones of an infant. Left and right sleeve members 313 are provided. An infant's arms are received within sleeve members 313 while collar member 312 rests against the infant's neck when infant is placed in an infant car seat. Left and right sleeve members 313 are constructed as contoured sleeve openings 3014 sized to conform with the wearer's wrists. Base section 308 comprises a base periphery having a base stabilization means via an elastic rim 351 arranged circumferentially to form a shallow shelf 361 that is appointed to receive the legs and feet of the infant. In this manner, the infant's legs and feet do not have to be disturbed; rather shallow shelf 361 is simply stretched and collapsed under the feet of the infant.

Additionally, in this embodiment, lateral sections 307 include a lateral perimeter each comprising a lateral elastic rim 371 constructed to form a shallow ridge 372 for hugging the infant's shoulders and a small part of their back. Cut-outs 373, located generally between base section 308 and lateral sections 307, may be provided for a lap piece of the safety of the car seat. Application of blanket 300 is initialized with placing the arms of child into each of the respective left and right sleeve members 313 and pushing central section 306 of blanket 300 onto the front torso of the child so that neck segment 309 of collar member 312 rests against the infant's neck. Lateral sections 307 and base section 308 is extended and lateral elastic rim 371 in the lateral perimeter of lateral sections 307 are stretched and gently released to embrace the infant's shoulders and part of the infant's shoulder blades within shallow ridge 372. Base section 308 is extended and elastic rim 351 of base periphery 309 is stretched and gently released to embrace the infant's feet and legs within shallow shelf 361. The infant is not disturbed when blanket 300 is being placed upon him/her as the blanket does not require placement behind the infant's back; rather, the elastic rims 371, 351 gently hug the proximate shoulder area and back area, as well as legs and feet and secure same in the shallow shelf or ridge.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A travel blanket appointed for placement upon an infant secured in a seat, comprising:
    a. a central section, lateral sections, a base section, and a collar member arranged to form an open back construction so that said blanket is appointed to be placed upon said infant secured within said seat by way of safety straps;
    b. left and right sleeve members constructed within said central section of said blanket adjacent to each of said lateral sections, said left and right sleeve members having a top arm portion and a wrist opening, wherein said top arm portion of said sleeve member is wider in width than said wrist opening and tapers or contours toward said wrist opening to form contoured or tapered sleeve members;
    c. said base section comprising a base periphery having a base stabilization means integrated therein appointed for securing said base section of said blanket on an outer bottom portion of said seat;
    d. said lateral sections each comprising a top perimeter and a lateral perimeter, said lateral perimeter having a lateral stabilization means extending substantially along said lateral perimeter appointed for aiding in securing said lateral sections on an outer side portion and said outer bottom portion of said seat;
    e. said collar member having side edges terminating at said top perimeter of each of said lateral sections so that said collar member does not extend beyond said top perimeter of said lateral sections, said collar member comprises an abutting neck segment providing extra thickness to said collar member appointed for comfort and added warmth to said infant;
    f. elongated shoulder flaps extending from said side edges of said collar member and running parallel along a portion of said top perimeter of each of said lateral sections and merging to terminate at said top perimeter, said elongated shoulder flaps pleated/gathered at said side edges of said collar member and wherein said elongated shoulder flaps are adapted to cover a top of a shoulder of said infant; and
    g. said abutting neck segment is in a rolled condition;
    wherein said left and right sleeve members having contoured sleeve openings are appointed to receive arms and conform to wrists of said infant and said collar member and said central section is appointed to rest against said infant's neck, chest, front torso, legs and feet, while said lateral sections and said base section are appointed to extend over said infant and said seat and are appointed to be secured onto said seat, thereby appointed to avoid any need for adjusting said safety straps and jostling or otherwise disturbing said infant.

2. A blanket as recited by claim 1, wherein said abutting neck segment includes a cushion integrated therein.

3. A blanket as recited by claim 1, wherein said contoured sleeve openings include an elastic periphery band.

4. A blanket as recited by claim 1, wherein said contoured sleeve openings include a muffle for keeping hands and fingers of said infant warm.

5. A blanket as recited by claim 1, wherein said contoured sleeve openings include mittens.

6. A blanket as recited by claim 5, wherein said mittens are attached to said contoured sleeve openings by short elastic segments.

7. A blanket as recited by claim 5, wherein said mittens are detachable from said contoured sleeve openings and include fastening means.

8. A blanket as recited by claim 1, wherein said base stabilization means located on said base periphery of said base section comprises a dense weighted cord and said base section is appointed to extend over and weight on said outer bottom portion of said car seat so that legs and feet of said infant are not lifted or moved when said blanket is secured around said outer bottom of said car seat.

9. A blanket as recited by claim 1, wherein said base stabilization means located on said base periphery of said base section comprise an elastic material so that said base section is merely stretched to extend over and clasped on said outer bottom portion of said car seat so that legs and feet of said infant are not lifted or moved when said blanket is secured around said outer bottom of said car seat.

10. A blanket as recited by claim 1, wherein said travel blanket is constructed having a removable thermal lining to adjust for colder days.

11. A blanket as recited by claim 1, wherein said blanket includes attachment means appointed to removably attach and secure items, such as pacifiers and toys, to said blanket so that said infant can easily reach and access said item while preventing said item from becoming lost or dropped.

12. A blanket as recited by claim 11, wherein said attachment means is located on said central section of said blanket and comprises loops for clipping or temporarily attaching said item to said blanket.

13. A blanket as recited by claim 1 comprising an outer water proof shell covering said blanket adapted to prevent water penetration onto said infant.

14. A blanket as recited by claim 13, wherein said outer water proof shell covering said blanket is removable.

* * * * *